(12) United States Patent
Izutani et al.

(10) Patent No.: US 8,746,274 B2
(45) Date of Patent: Jun. 10, 2014

(54) HYDROGEN SUPPLY APPARATUS AND FUEL GAS SUPPLY APPARATUS

(71) Applicant: Toyota Jidosha Kabushiki Kaisha, Toyota (JP)

(72) Inventors: Takahide Izutani, Susono (JP); Tatsuaki Yokoyama, Susono (JP); Syuuji Hirakata, Susono (JP); Osamu Yumita, Gotenba (JP); Hiroshi Fujitani, Susono (JP); Keigo Suematsu, Susono (JP); Masaaki Matsusue, Mishima (JP); Nobuo Watanabe, Susono (JP); Katsuhiko Oshikawa, Susono (JP); Katsuhiko Hirose, Niwa-gun (JP); Takumi Kuwahara, Toyota (JP); Atsushi Matsuba, Mishima (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/790,457

(22) Filed: Mar. 8, 2013

(65) Prior Publication Data
US 2013/0189593 A1 Jul. 25, 2013

Related U.S. Application Data

(62) Division of application No. 11/991,666, filed as application No. PCT/JP2006/317670 on Sep. 6, 2006, now abandoned.

(30) Foreign Application Priority Data

Sep. 7, 2005 (JP) .................................. 2005-259129
Aug. 3, 2006 (JP) .................................. 2006-211730

(51) Int. Cl.
*F16K 49/00* (2006.01)

(52) U.S. Cl.
USPC ............................................ 137/334; 137/341

(58) Field of Classification Search
CPC .......................... F17C 11/005; H01M 8/04201
USPC ......................... 137/334, 341; 48/127.9, 195; 429/433–436, 443
See application file for complete search history.

(56) References Cited

U.S. PATENT DOCUMENTS 2,322,617 A  6/1943 Dayhuff
3,123,252 A * 3/1964 Kuntz ............................... 222/1

(Continued)

FOREIGN PATENT DOCUMENTS

EP  1 464 693 A2  10/2004
EP  1 653 148 A1  5/2006

(Continued)

OTHER PUBLICATIONS

Office Action issued Mar. 21, 2012 in JP 2006-211730 and English translation thereof (Considered in parent application).

*Primary Examiner* — John Fox
*Assistant Examiner* — Kevin Murphy
(74) *Attorney, Agent, or Firm* — Kenyon & Kenyon LLP

(57) ABSTRACT

Disclosed is a hydrogen supply apparatus which can mix an odorant with hydrogen gas even at a low temperature and can detect the leakage of the hydrogen gas. The apparatus comprises a gas storage means for storing hydrogen gas therein, an odorant-addition means for adding an odorant to the hydrogen gas fed from the gas storage means, and a temperature control means for controlling the temperature of at least one of the hydrogen gas stored in the gas storage means, the hydrogen gas fed from the gas storage means and the odorant.

3 Claims, 11 Drawing Sheets

(56) References Cited

U.S. PATENT DOCUMENTS

| | | | |
|---|---|---|---|
| 3,634,053 A * | 1/1972 | Klass et al. | 48/195 |
| 3,907,515 A | 9/1975 | Mulliner | |
| 4,025,315 A | 5/1977 | Mazelli | |
| 4,219,725 A | 8/1980 | Groninger | |
| 4,611,294 A * | 9/1986 | Stanfill | 700/68 |
| 4,684,786 A | 8/1987 | Mann et al. | |
| 5,105,063 A | 4/1992 | Hockemier | |
| 5,531,242 A | 7/1996 | Paganessi | |
| 5,632,295 A | 5/1997 | Sm.ang.rs | |
| 6,142,162 A | 11/2000 | Arnold | |
| 6,418,275 B1 | 7/2002 | Yang | |
| 6,609,540 B1 | 8/2003 | Torisu et al. | |
| 7,248,791 B2 | 7/2007 | Toth | |
| 2002/0094467 A1 | 7/2002 | Nonobe et al. | |
| 2004/0076413 A1 | 4/2004 | Biess et al. | |
| 2004/0197919 A1 | 10/2004 | Herman et al. | |
| 2005/0100332 A1 | 5/2005 | Wen | |
| 2006/0211119 A1 | 9/2006 | Herman et al. | |

FOREIGN PATENT DOCUMENTS

| | | |
|---|---|---|
| JP | 59-219392 A | 12/1984 |
| JP | 08-325583 A | 12/1996 |
| JP | 10-279968 A | 10/1998 |
| JP | 2002-029701 A | 1/2002 |
| JP | 2002-216812 A | 8/2002 |
| JP | 2003-028394 A | 1/2003 |
| JP | 2004-111167 A | 4/2004 |
| JP | 2004-311436 A | 11/2004 |
| JP | 2004-315566 A | 11/2004 |
| JP | 2007-024192 A | 2/2007 |
| WO | 2005/010427 A1 | 2/2005 |

* cited by examiner

HYDROGEN SUPPLY APPARATUS AND FUEL GAS SUPPLY APPARATUS

This is a division of application Ser. No. 11/991,666 filed 7 Mar. 2008, which is a 371 national phase application of PCT/JP2006/317670 filed 6 Sep. 2006, claiming priority to Japanese Patent Application No. 2005-259129 filed 7 Sep. 2005, and No. 2006-211730 filed 3 Aug. 2006, respectively, the contents of which are incorporated herein by reference.

FIELD OF THE INVENTION

The present invention relates to a hydrogen supply apparatus and a fuel gas supply apparatuses, each of which can be suitably used in a fuel cell system that generates electric energy by an electrochemical reaction in particular.

BACKGROUND OF THE INVENTION

A fuel cell system for obtaining electric energy by an electrochemical reaction between a hydrogen gas and an oxidation gas is known. The hydrogen gas serving as a fuel for this fuel cell system is flammable and odorless. On the other hand, in handling a hydrogen gas, it is preferable to be able to recognize the presence of the hydrogen gas with certainty.

Therefore, a hydrogen supply apparatus that mixes a hydrogen gas with an odorant whose presence is recognizable due to its odor has been provided (see, for example, Patent Document 1). In this hydrogen supply apparatus, since the hydrogen gas and the odorant are mixed, the handling of the hydrogen gas is facilitated. Further, in the case where the leakage of the hydrogen gas has occurred, for example, the leakage of the hydrogen gas can be immediately detected due to the odor of the odorant.
[Patent document 1] JP 2002-29701 A
[Patent document 2] JP 2002-216812 A
[Patent document 3] JP 2004-111167 A

SUMMARY OF THE INVENTION

Problems to be Solved by the Invention

In order to detect the leakage of the hydrogen gas, the odorant and the hydrogen gas have to be mixed. However, in the case where the hydrogen gas has reached an extremely low temperature, the odorant has sometimes been solidified, and the hydrogen gas and the odorant have not been mixed at an extremely low temperature in some cases. In a system for storing the hydrogen gas in a high-pressure state, such as a high-pressure hydrogen tank in particular, the hydrogen gas has reached an extremely low temperature due to adiabatic expansion during the hydrogen supply, and the hydrogen gas has been supplied while not being mixed with the odorant in some cases.

The present invention has been made in view of the various problems mentioned above, and it is an object of the present invention to provide a hydrogen supply apparatus capable of mixing an odorant with a hydrogen gas even at a low temperature, and detecting the hydrogen gas leakage.

Means for Solving the Problems

In order to solve the above-mentioned problems, the present invention adopts the following means. That is, a hydrogen supply apparatus according to the present invention includes: gas storage portion which stores a hydrogen gas; an odorant addition portion which adds an odorant to the hydrogen gas; and a temperature adjustment portion which adjusts a temperature of at least one of the hydrogen gas, the odorant, and the hydrogen gas to which the odorant has been added.

In the hydrogen supply apparatus, upon supply of the hydrogen gas stored in the gas storage portion to the outside thereof, the pressure of the hydrogen gas is reduced, and the hydrogen gas undergoes adiabatic expansion. Thus, the temperature of the hydrogen gas is reduced. When the temperature of the hydrogen gas is reduced to a level equal to or lower than a predetermined temperature, the odorant to be mixed with the hydrogen gas is solidified or liquefied, and may have difficulty in mixing with the hydrogen gas.

The hydrogen supply apparatus according to the present invention increases the temperature of at least one of the hydrogen gas and the odorant by the temperature adjustment portion to suppress a temperature reduction in hydrogen gas, thus making it possible to maintain the odorant in a state in which (or at a temperature at which) the odorant can be mixed with the hydrogen gas. The hydrogen gas whose temperature is increased may be a hydrogen gas stored in the gas storage portion, or may be a hydrogen gas supplied to the outside from the gas storage portion. Further, the hydrogen gas supplied to the outside includes a hydrogen gas to which the odorant has been added. It should be noted that the hydrogen gas supply apparatus according to the present invention can add the odorant to the hydrogen gas by including odorant addition portion. The hydrogen gas to which the odorant is to be added may be a hydrogen gas stored in the gas storage portion, or may be a hydrogen gas discharged from the gas storage portion. Further, the hydrogen gas, to which the odorant has been added by the odorant addition portion, is supplied to the supply destination for the hydrogen gas, i.e., a hydrogen gas utilization apparatus such as a fuel cell or a hydrogen engine.

Further, a hydrogen supply apparatus according to the present invention may be characterized by further including stored gas temperature detection portion which detects the temperature of the hydrogen gas stored in the gas storage portion, and characterized in that the temperature adjustment portion has a gas temperature reduction suppression portion which suppresses a temperature reduction in hydrogen gas stored in the gas storage portion, when the temperature of the hydrogen gas detected by the stored gas temperature detection portion is equal to or lower than a predetermined temperature.

When the temperature of the hydrogen gas is equal to or lower than the predetermined temperature, a temperature reduction in hydrogen gas is suppressed by the gas temperature reduction suppression portion, thus making it possible to maintain the odorant in a state in which (or at a temperature at which) the odorant can be mixed with the hydrogen gas. It should be noted that the hydrogen gas may be one mixed with the odorant. With the use of the hydrogen gas mixed with the odorant, the hydrogen gas mixed with the odorant can be supplied, and the detection accuracy of the hydrogen gas leakage can be improved. The predetermined temperature refers to a temperature below which the odorant is changed into, for example, a solid form incapable of mixing with the hydrogen gas, and is appropriately set in accordance with the properties of the odorant.

Further, a hydrogen supply apparatus according to the present invention may be characterized by further including hydrogen gas temperature detection portion which detects the temperature of the hydrogen gas supplied from the gas storage portion, and characterized in that the temperature adjustment portion has a heating portion which increases the temperature of the hydrogen gas supplied from the gas storage portion, when the temperature of the hydrogen gas detected by the hydrogen gas temperature detection portion is equal to or lower than a predetermined temperature.

The above-mentioned stored gas temperature detection portion detects the temperature of the hydrogen gas stored in the gas storage portion; on the other hand, the hydrogen gas temperature detection portion detects the temperature of the hydrogen gas, supplied to the outside of the gas storage portion, at the outside of the gas storage portion. That is, the hydrogen gas temperature detection portion is capable of detecting the temperature of the hydrogen gas to be supplied to the outside of the gas storage portion, which has been reduced due to adiabatic expansion. Based on the temperature of the hydrogen gas detected, the temperature adjustment portion increases the temperature of the hydrogen gas supplied from the gas storage portion, thereby making it possible to suppress the liquefaction or solidification of the odorant, resulting from the cooling thereof by the hydrogen whose temperature has been reduced. It should be noted that the heating portion may be any portion as long as it is capable of increasing the temperature of the hydrogen gas, and an example of which may be a heater.

Further, the hydrogen supply apparatus according to the present invention may be characterized by further including an odorant temperature detection portion which detects the temperature of the odorant to be added by the odorant addition portion, in which the temperature adjustment portion has a heating portion which increases the temperature of the odorant to be added by the odorant addition portion, when the temperature of the odorant detected by the odorant temperature detection portion is equal to or lower than a predetermined temperature.

In order to increase the temperature of the odorant, it is preferable to calculate the vapor pressure of the odorant from the temperature of the odorant detected, and to apply heat to the odorant so that it reaches a necessary vapor pressure. The necessary vapor pressure refers to a pressure at which the odorant added to the hydrogen gas does not liquefy or solidify. The supply of heat to the odorant may be carried out by providing an odorant storage portion which stores an odorant, for example, and by raising the temperature of the odorant storage portion using a heating portion such as a heater. By adjusting the vapor pressure of the odorant in this manner, the liquefaction or solidification of the odorant can be suppressed. It should be noted that the heating portion may be any portion as long as it can increase the temperature of the odorant, and an example of which may be a heater.

Further, the hydrogen supply apparatus according to the present invention may be characterized by further including: a hydrogen gas temperature detection portion which detects the temperature of the hydrogen gas supplied from the gas storage portion; and an odorant temperature detection portion which detects the temperature of the odorant added by the odorant addition portion, in which the temperature adjustment portion has a heating portion which increases the temperature of the odorant when at least one of the temperature of the hydrogen gas detected by the hydrogen gas temperature detection portion and the temperature of the odorant detected by the odorant temperature detection portion meets a predetermined condition.

In the present invention, the temperature of the odorant is adjusted not only based on the temperature of the odorant detected by the odorant detection portion, but also based on the temperature of the odorant detected by the hydrogen gas detection portion. The predetermined condition portion determines that the temperature of the hydrogen gas detected by the hydrogen gas temperature detection portion is equal to or lower than a predetermined temperature, or the temperature of the odorant detected by the odorant temperature detection portion is equal to or lower than a predetermined temperature. It should be noted that temperatures to be employed may be prioritized, and the temperature of the odorant may be increased based on a high-priority temperature. The heating portion may be any portion as long as it can increase the temperature(s) of the hydrogen gas and/or the odorant, and an example of which may be a heater.

Further, a hydrogen supply apparatus according to the present invention may be characterized by further including a hydrogen gas temperature detection portion which detects the temperature of the hydrogen gas supplied from the gas storage portion, and characterized in that the temperature adjustment portion has a heating portion which increases the temperature of the hydrogen gas which is supplied from the gas storage portion and to which the odorant has been added by the odorant addition portion, when the temperature of the hydrogen gas detected by the hydrogen gas temperature detection portion is equal to or lower than a predetermined temperature.

According to the present invention, the temperature of the hydrogen gas, to which the odorant has been added by the odorant addition portion, is adjusted, thereby suppressing the liquefaction or solidification of the odorant contained in the hydrogen gas. As described above, upon supply of the hydrogen gas stored in the gas storage portion to the outside thereof, the temperature may be reduced due to adiabatic expansion. However, the causes of the temperature reduction in hydrogen gas are not limited to this, and it may also be possible that the temperature of the hydrogen gas is reduced, for example, by placing the hydrogen gas supply apparatus in a below-freezing environment. Even if the hydrogen gas or odorant is heated, the temperature reduction in hydrogen gas due to such a cause may occur because of the subsequent gradual loss of heat from the hydrogen gas, for example. According to the present invention, the temperature of the hydrogen gas after the addition of the odorant can be increased, and therefore, the liquefaction or the like of the odorant can be prevented even if the hydrogen gas supply apparatus is placed in a below-freezing environment.

Further, a hydrogen supply apparatus according to the present invention may be characterized by further including a hydrogen gas supply amount adjustment portion which adjusts a supply amount of the hydrogen gas supplied from the gas storage portion, and characterized in that the temperature adjustment portion decreases the supply amount of the hydrogen gas, supplied from the gas storage portion, by the hydrogen gas supply amount adjustment portion, to thereby suppress a temperature reduction in hydrogen gas.

Upon supply of the hydrogen gas from the gas storage portion to the outside thereof, the hydrogen gas inside the gas storage portion is decreased, and the temperature of the hydrogen gas is reduced due to adiabatic expansion. In particular, if the hydrogen gas is stored in a high-pressure state in a high-pressure hydrogen tank, for example, the pressure is sharply reduced, which results in a significant temperature reduction. However, upon decrease in the supply amount of the hydrogen gas, the temperature reduction is decreased.

Accordingly, when the temperature of the hydrogen gas is equal to or lower than the predetermined temperature, the supply amount of the hydrogen gas is preferably decreased by the hydrogen gas supply amount adjustment portion, and the temperature reduction can be suppressed to facilitate the mixing of the odorant with the hydrogen gas by decreasing the supply amount of the hydrogen gas.

Further, a hydrogen supply apparatus according to the present invention may be characterized in that the predetermined temperature is equal to or higher than a melting point of the odorant. That is, when the temperature of the hydrogen gas detected by the stored gas temperature detection portion or the hydrogen gas temperature detection portion is equal to or lower than the predetermined temperature that is equal to or higher than the melting point of the odorant, the temperature adjustment portion increases the temperature of at least one of the hydrogen stored in the gas storage portion, the hydrogen gas supplied from the gas storage portion, and the odorant.

The melting point of the odorant is a temperature at which the odorant changes from a solid form to a liquid form. When the temperature of the odorant is reduced to be lower than the melting point thereof, the odorant is turned into a solid form, which has difficulty in mixing with the hydrogen gas. At such a temperature, the hydrogen gas and the odorant may not be mixed, and the detection accuracy of the hydrogen gas leakage may be degraded.

Accordingly, the predetermined temperature is set equal to or higher than the melting point of the odorant so as to suppress a temperature reduction in hydrogen gas when the temperature of the hydrogen gas is equal to or lower than the predetermined temperature, thereby suppressing the solidification of the odorant, and allowing the odorant to be present in a liquid form or in a gaseous form. Generally, it is difficult to mix the odorant in a solid form with the hydrogen gas, and therefore, the odorant is provided in a liquid form or in a gaseous form, thus facilitating the mixing of the odorant with the hydrogen gas.

It should be noted that the predetermined temperature is set equal to or higher than the melting point of the odorant because it is suitable for the odorant, which can be mixed with the hydrogen gas or is easily mixed therewith in a liquid state, and this temperature is appropriately changed in accordance with the properties of the odorant.

Further, a hydrogen supply apparatus according to the present invention may be characterized in that the predetermined temperature is equal to or higher than a boiling point of the odorant. That is, when the temperature of the hydrogen gas, detected by the gas temperature detection portion, is equal to or lower than the predetermined temperature that is equal to or higher than the boiling point of the odorant, the gas temperature reduction suppression portion increases the temperature of at least one of the hydrogen stored in the gas storage portion, the hydrogen gas supplied from the gas storage portion, and the odorant.

The boiling point of the odorant is a temperature at which the odorant changes from a liquid form to a gaseous form. When the temperature of the odorant is reduced to be lower than the boiling point thereof, the odorant is changed into a liquid form, which may have difficulty in mixing with the hydrogen gas depending on the properties of the odorant. The odorant, which will not be mixed with the hydrogen gas or have difficulty in mixing therewith in a liquid state, may degrade the detection accuracy of the hydrogen gas leakage.

Accordingly, by suppressing a temperature reduction in hydrogen gas when the temperature of the hydrogen gas is at the predetermined temperature that is equal to or higher than the boiling point of the odorant, the odorant is kept in a gaseous state, thus making it possible to facilitate the mixing of the odorant with the hydrogen gas.

It should be noted that the predetermined temperature is set equal to or higher than the boiling point of the odorant because it is suitable for the odorant, which can be mixed with the hydrogen gas or is easily mixed therewith in a gaseous state, and this temperature is appropriately changed in accordance with the properties of the odorant.

Further, a hydrogen supply apparatus according to the present invention may be characterized by including: a gas storage portion which stores a hydrogen gas mixed with an odorant; a gas supply portion which supplies the hydrogen gas from the gas storage portion; and a gas temperature detection portion which detects the temperature of the hydrogen gas stored in the gas storage portion; and a gas temperature reduction suppression portion which suppresses a temperature reduction in hydrogen gas stored in the gas storage portion, when the temperature of the hydrogen gas detected by the gas temperature detection portion is equal to or lower than a predetermined temperature.

By suppressing a temperature reduction in hydrogen gas using the gas temperature reduction suppression portion when the temperature of the hydrogen gas mixed with the odorant is equal to or lower than the predetermined temperature, the odorant can be maintained in a state in which (or at a temperature at which) it can be mixed with the hydrogen gas. Accordingly, the hydrogen gas mixed with the odorant can be supplied, thus enabling an improvement in the detection accuracy of the hydrogen gas leakage. The predetermined temperature is a temperature below which the odorant is changed into a solid state, for example, which cannot be mixed with the hydrogen gas, and is appropriately set in accordance with the properties of the odorant.

Further, a hydrogen supply apparatus according to the present invention may be characterized by further including a hydrogen gas temperature detection portion which detects the temperature of the hydrogen gas supplied from the gas storage portion, and characterized in that the temperature adjustment portion has a heating portion which increases the temperature of the hydrogen gas which is supplied from the gas storage portion and to which the odorant has been added by the odorant addition portion, when the temperature of the hydrogen gas detected by the hydrogen gas temperature detection portion is equal to or lower than a predetermined temperature. Thus, it is possible to increase the temperature of the hydrogen gas, which has been mixed with the odorant, and which is to be supplied to the outside from the gas storage portion.

Besides, the hydrogen supply apparatus according to the present invention may be characterized in that the gas temperature reduction suppression portion suppresses a temperature reduction in hydrogen gas by decreasing the supply amount of the hydrogen gas.

The hydrogen supply apparatus according to the present invention is satisfactory as long as it can suppress a temperature reduction in hydrogen gas when the temperature of the hydrogen gas is equal to or lower than a predetermined temperature at which the hydrogen gas has difficulty in mixing with the odorant; for example, in addition to the above-mentioned configurations, the apparatus may be provided with a limiter for stopping the supply of the hydrogen gas when the temperature thereof is equal to or lower than the predetermined temperature, so as to prevent a decrease in the hydrogen gas inside a hydrogen storage device, and to suppress a temperature reduction in hydrogen gas, or the apparatus may be provided with a plurality of gas storage portions so as to use the hydrogen gas inside the gas storage portion in which the temperature of the hydrogen gas is higher than the predetermined temperature, without the use of the gas storage portion in which the temperature of the hydrogen gas is lower than the predetermined temperature, thereby maintaining the temperature of the hydrogen gas to be supplied above the predetermined temperature.

Actually, each of the hydrogen supply apparatuses described above is an apparatus for supplying a hydrogen gas as a fuel gas. It should be noted that problems that the odorant is not solidified at a low temperature and the hydrogen gas is not mixed with the odorant at an extremely low temperature are not limited to the hydrogen gas, but those problems are possible in general fuel gas. Accordingly, an object of the present invention is to provide a fuel gas supply apparatus capable of mixing an odorant with a fuel gas even at a low temperature, and detecting the fuel gas leakage.

In order to solve the above-mentioned problems, the present invention adopts the following portion. That is, a fuel gas supply apparatus according to the present invention is characterized by including: a gas storage portion which stores a fuel gas; an odorant addition portion which adds an odorant to the fuel gas; and a temperature adjustment portion which adjusts the temperature of at least one of the hydrogen gas, the odorant, and the hydrogen gas to which the odorant has been added.

The fuel gas supply apparatus according to the present invention has functions equivalent to those of each hydrogen supply apparatus already described above. This is because "fuel gas" is a generic name for a natural gas, a liquefied petroleum gas and the like, and a hydrogen gas is also included in a fuel gas. Accordingly, the configuration of the above-mentioned fuel gas supply apparatus can be described by replacing the hydrogen gas in each hydrogen supply apparatus already described above with a fuel gas. Therefore, the description thereof will be omitted.

It should be noted that examples of the fuel gas include a natural gas, and a liquefied petroleum gas (LPG) composed of propane and butane and utilized as a mixture thereof. It should be noted that the natural gas includes a compressed natural gas (hereinafter, referred to as "CNG"). Further, if hydrogen is reformed by a reformer, a resultant reformed gas is also included in the fuel gas. Further, the fuel gas supply apparatus for supplying those fuel gases is applicable to a fuel cell serving as a fuel gas consumption device that consumes a fuel gas, a hydrogen engine, a CNG engine, an LPG engine, and a reformer for reforming a fuel gas, for example. It should be noted that a reformer for reforming a fuel gas refers to a reformer for reforming, for example, a fuel gas to hydrogen.

According to the hydrogen supply apparatus of the present invention, a temperature reduction in a hydrogen gas can be suppressed even at a low temperature, an odorant and a hydrogen gas can be mixed, and the hydrogen gas leakage can be detected.

DETAILED DESCRIPTION

Embodiments of hydrogen supply apparatuses according to the present invention will be described in detail with reference to the drawings.

Embodiment 1

Figure 1:
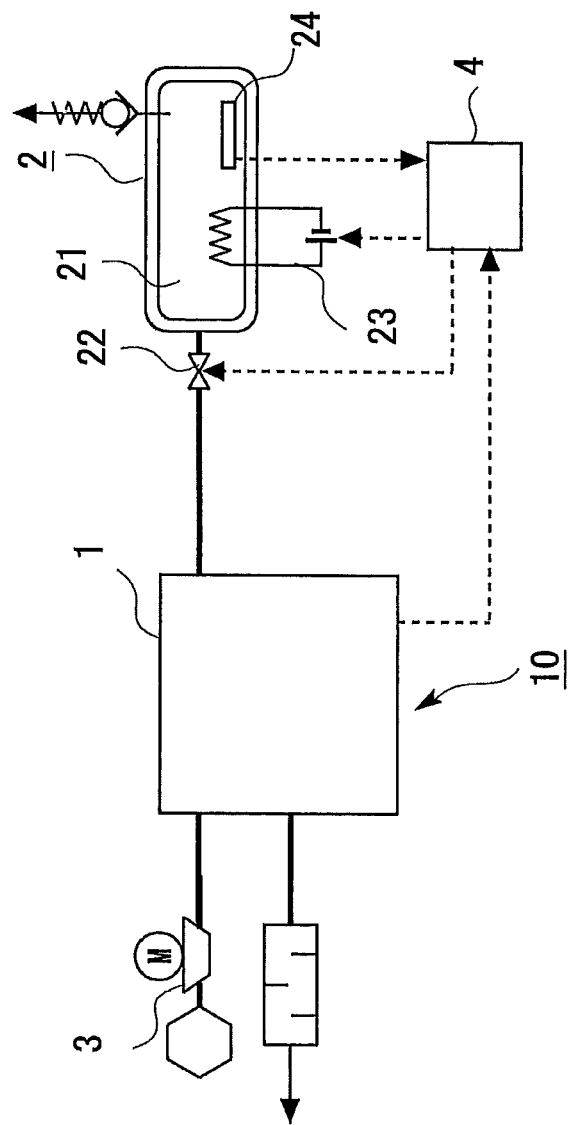
FIG. 1 A block diagram of a fuel cell system 10 according to Embodiment 1.

FIG. 1 is a system block diagram of a fuel cell system 10 including a hydrogen supply apparatus according to Embodiment 1. This fuel cell system includes: a fuel cell 1; a high-pressure hydrogen tank 2 which stores a hydrogen gas serving as a fuel gas, and which functions as a hydrogen supply apparatus for supplying the hydrogen gas to the fuel cell 1; an air supply apparatus 3 for supplying air to the fuel cell 1; and an electronic control unit (ECU) 4 for controlling the various apparatuses.

The high-pressure hydrogen tank 2 includes: a tank 21 serving as gas storage portion in which the hydrogen gas mixed with an odorant is stored; a main stop valve 22 through which the hydrogen gas is supplied to the fuel cell 1; a heater 23 serving as a heating portion for increasing the temperature of the hydrogen gas inside the tank 21; and a thermometer 24 serving as a gas temperature detection portion which detects the temperature of the hydrogen gas inside the tank 21.

The fuel cell 1 causes an electrochemical reaction between the hydrogen gas and an oxidation gas via an electrolyte to obtain electric energy. The fuel cell 1 according to Embodiment 1 is a solid polymer electrolyte fuel cell frequently used in an electric automobile that runs using a fuel cell as a power supply.

The hydrogen gas stored in the high-pressure hydrogen tank 2 contains methyl acrylate as an odorant. The odorant gives the hydrogen gas an odor by mixing the odorant into an odorless hydrogen gas, and serves to detect the hydrogen gas leakage. The methyl acrylate has a boiling point of about 80° C. and a melting point of about −75° C.

The main stop valve 22 serves as a supply port through which the hydrogen gas is supplied from the tank 21 to the fuel cell 1, and a supply flow rate therethrough is controlled by the ECU 4. Further, the main stop valve 22 is a solenoid valve, which is heated by passing an electric current therethrough, and which can indirectly heat the hydrogen gas to be supplied to the fuel cell 1. That is, the main stop valve 22 has a function of a heating portion like the heater 23.

The heater 23 is disposed at a lower part of the tank 21, and can directly heat the hydrogen gas inside the tank 21 with the control of the ECU 4. The position at which the heater 23 is placed may be any position as long as the hydrogen gas inside the tank 21 can be heated, and is not limited to the lower part of the tank 21; however, when the odorant is in a solid form or in a liquid form, the hydrogen gas is accumulated at the lower part of the tank 21, and therefore, the hydrogen gas can be efficiently heated by placing the heater 23 at the lower part of the tank 21.

The thermometer 24 serves to detect the temperature of the hydrogen gas inside the tank 21, and is configured so that the temperature of the hydrogen gas detected is inputted to the ECU 4. The ECU 4 controls the main stop valve 22 or the heater 23 based on the temperature of the hydrogen gas detected by the thermometer 24, thereby maintaining the hydrogen gas inside the tank 21 at an appropriate temperature.

Hereinafter, the temperature control of the hydrogen gas in the fuel cell system 10 configured as described above will be described in detail. Each of the various controls described below is executed by the ECU 4, and is a routine repeated at regular intervals.

Figure 2:
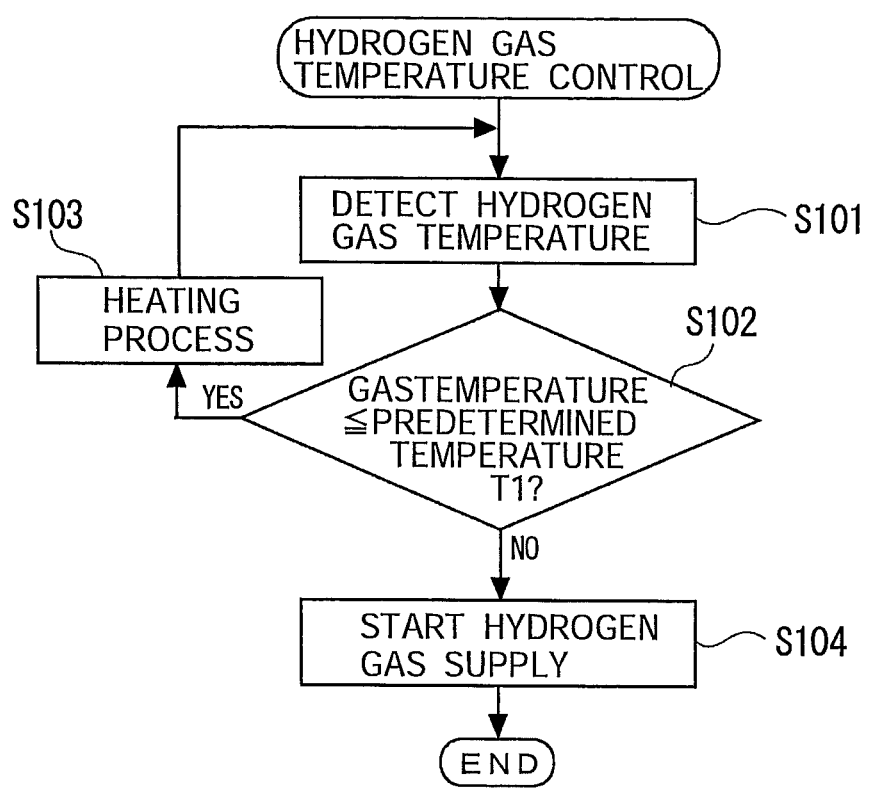
FIG. 2 A flow chart illustrating the temperature control of a hydrogen gas in the fuel cell system 10 according to Embodiment 1.

Embodiment 1 provides temperature control prior to the start of supply of the hydrogen gas, and is an embodiment in which when the temperature of the hydrogen gas inside the high-pressure hydrogen tank 2 is equal to or lower than a predetermined temperature, the temperature of the hydrogen gas is increased by the heater 23 or the main stop valve 22 to create a state where the mixing of the odorant with the hydrogen gas is facilitated, thus supplying the hydrogen gas mixed with the odorant to the fuel cell. FIG. 2 is a flow chart illustrating the temperature control of the hydrogen gas according to Embodiment 1.

First, at the start of the supply of the hydrogen gas from the high-pressure hydrogen tank 2 to the fuel cell 1, the temperature of the hydrogen gas inside the tank 21 is detected by the thermometer 24 (Step 101). The detected temperature is inputted to the ECU 4, and the ECU 4 determines whether the detected temperature is equal to or lower than a predetermined temperature T1 (Step 102).

In Embodiment 1, methyl acrylate is used as the odorant, and the predetermined temperature T1 is set to $-70°$ C., which is $5°$ C. higher than $-75°$ C., i.e., the melting point of methyl acrylate. That is, at a temperature higher than the predetermined temperature T1, the methyl acrylate is present as a liquid, and is in a state in which the methyl acrylate is easily mixed with the hydrogen gas.

When the temperature of the hydrogen gas detected is equal to or lower than the predetermined temperature T1, the ECU 4 carries out a heating process so as to prevent the odorant from being solidified (Step 103). In the heating process, the hydrogen gas may be directly heated by passing an electric current through the heater 24, or the hydrogen gas to be supplied may be indirectly heated by passing an electric current through the main stop valve 22. After having carried out the heating process for a certain period of time by any one of methods, the temperature of the hydrogen gas inside the tank 21 is detected again by the thermometer 24 (Step 101).

It is determined again whether the temperature of the hydrogen gas detected is equal to or lower than T1 (Step 102), and the heating process is repeated until it is determined that the temperature of the hydrogen gas inside the tank 21 is higher than the predetermined temperature T1. If the temperature of the hydrogen gas detected by the thermometer 24 is determined to be higher than the predetermined temperature T1 as a result of the determination of Step 102, it is determined that the methyl acrylate serving as the odorant is in a liquid form and is mixed with the hydrogen gas, thus starting the supply of the hydrogen gas (Step 104).

It should be noted that if the supply of the hydrogen gas is continued, the temperature thereof is reduced due to the adiabatic expansion of the hydrogen gas, and therefore, the present control is repeated at certain periods of time even after the supply of the hydrogen gas has been started. As described above, according to Embodiment 1, the hydrogen gas can be supplied at a temperature at which the odorant is easily mixed with the hydrogen gas, thus facilitating the mixing of the hydrogen gas with the odorant, and enabling an improvement in the detection accuracy of the hydrogen gas leakage.

Further, in Embodiment 1, the temperature control of the hydrogen gas is performed before the start of supply of the hydrogen gas, but the temperature control does not necessarily have to be performed before the start of supply of the hydrogen gas, and may be performed during the supply of the hydrogen gas. It should be noted that when the temperature control is performed during the supply of the hydrogen gas, a hydrogen supply stopping portion which stops the supply of the hydrogen gas may further be provided, if the temperature of the hydrogen gas is equal to or lower than the predetermined temperature T1. By providing the hydrogen supply stopping portion, the supply of the hydrogen gas equal to or lower than the predetermined temperature is stopped, thus making it possible to prevent the hydrogen gas, which is not mixed with the odorant at a low temperature, from being supplied to the fuel cell 1.

Embodiment 2

In Embodiment 2, when the temperature of the hydrogen gas inside the high-pressure hydrogen tank 2 is equal to or lower than the predetermined temperature, the flow rate of the hydrogen gas to be supplied to the fuel cell 1 is reduced, thereby preventing a decrease in the hydrogen gas inside the tank 21. By preventing the decrease in the hydrogen gas inside the tank 21, the temperature reduction in hydrogen gas due to adiabatic expansion is suppressed. The hydrogen gas temperature control according to Embodiment 2 is the temperature control carried out during the supply of the hydrogen gas. It should be noted that the configuration of the fuel cell system is substantially the same as in Embodiment 1; therefore, the same components are identified by the same reference numerals, and the description thereof will be omitted.

In the fuel cell system 10 according to Embodiment 2, the ECU 4, serving as gas temperature control portion, has a function of adjusting the supply flow rate of the hydrogen gas to be supplied from the high-pressure hydrogen tank 2 to the fuel cell 1. If the temperature indicated by the thermometer 24 serving as gas temperature detection portion is equal to or lower than a predetermined temperature, the ECU 4 reduces the supply flow rate of the hydrogen gas to suppress the adiabatic expansion of the hydrogen gas inside the tank 21, and to suppress the temperature reduction in hydrogen gas inside the tank 21. By suppressing the temperature reduction in hydrogen gas in this manner, the odorant contained in the hydrogen gas can be maintained at a temperature higher than a constant temperature at which the odorant is easily mixed with the hydrogen gas, and the hydrogen gas mixed with the odorant can be furnished to the fuel cell 1.

Figure 3:
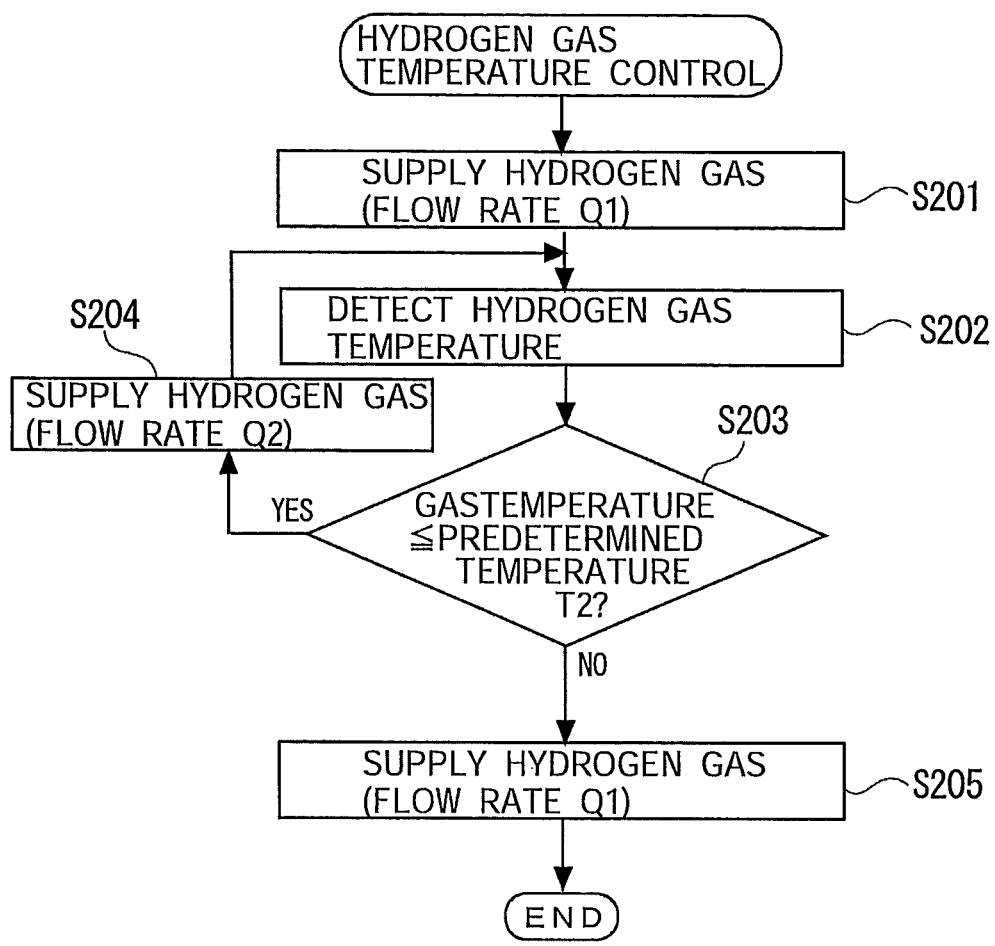
FIG. 3 A flow chart illustrating the temperature control of a hydrogen gas in the fuel cell system 10 according to Embodiment 2.

FIG. 3 is a flow chart illustrating the temperature control of the hydrogen gas according to Embodiment 2. First, the hydrogen gas is supplied from the high-pressure hydrogen tank 2 to the fuel cell 1 at a supply flow rate Q1 (Step 201). After a certain period of time has passed since the supply of the hydrogen gas, the temperature of the hydrogen gas inside the tank 21 is detected by the thermometer 24 (Step 202). The detected temperature is inputted to the ECU 4, and the ECU 4 determines whether the temperature of the hydrogen gas detected is equal to or lower than a predetermined temperature T2 (Step 203).

Also in Embodiment 2, similarly to Embodiment 1, methyl acrylate is used as the odorant. However, the predetermined temperature T2 is set to $-65°$ C., which is $10°$ C. higher than $-75°$ C., i.e., the melting point of methyl acrylate. The reason the predetermined temperature T2 is set higher than the predetermined temperature in Embodiment 1 is that in Embodiment 1, the temperature reduction to the predetermined temperature T1 or lower is impossible since the hydrogen gas is heated by the heating portion, but in Embodiment 2, the slight temperature reduction to the predetermined temperature T2 or lower is possible since the temperature reduction is suppressed without performing any heating process. Accordingly, the predetermined temperature T2 in Embodiment 2 is set 5° C. higher than the predetermined temperature T1 in Embodiment 1.

If the temperature of the hydrogen gas detected is equal to or lower than the predetermined temperature T2, the ECU 4 changes the supply flow rate of the hydrogen gas from Q1 to Q2 (where Q2<Q1) in order to suppress the temperature reduction in hydrogen gas (Step 204). By reducing the supply flow rate of the hydrogen gas, the adiabatic expansion of the hydrogen gas inside the tank 21 is suppressed, and the temperature reduction in hydrogen gas is suppressed.

After having supplied the hydrogen gas to the fuel cell 1 at the supply flow rate Q2 for a certain period of time, the temperature of the hydrogen gas is detected again (Step 202). The ECU 4 determines whether the temperature of the hydrogen gas detected is equal to or lower than the predetermined temperature T2 (Step 203), and the hydrogen gas is supplied at the supply flow rate Q2 until the temperature of the hydrogen gas is determined to be higher than the predetermined temperature T2. If the temperature of the hydrogen gas detected by the thermometer 24 is determined to be higher than the predetermined temperature T2 as a result of the determination of Step 203, the supply flow rate of the hydrogen gas is changed from Q2 to Q1, and the hydrogen gas is supplied at the supply flow rate Q1 (Step 205).

By detecting the temperature of the hydrogen gas during the supply of the hydrogen gas and reducing the supply flow rate of the hydrogen gas when the temperature of the hydrogen gas is reduced nearly to the melting point in this manner, the hydrogen gas can be supplied at a temperature at which the odorant is easily mixed with the hydrogen gas, thus making it possible to facilitate the mixing of the hydrogen gas with the odorant, and to improve the detection accuracy of the hydrogen gas leakage.

Alternatively, in another embodiment, a fuel cell system including the plurality of high-pressure hydrogen tanks 2 may be configured so that, instead of reducing the supply flow rate of the hydrogen gas when the temperature of the hydrogen gas is equal to or lower than the predetermined temperature T2, the high-pressure hydrogen tank, in which the temperature of the hydrogen gas is higher than the predetermined temperature T2, is selected to supply the hydrogen gas from the high-pressure hydrogen tank to the fuel cell.

Embodiment 3

Next, a fuel cell system 11 including a hydrogen supply apparatus according to Embodiment 3 will be described. In the fuel cell system 10 according to Embodiment 1, the hydrogen gas inside the tank 21 is directly heated by the control of the ECU 4. On the other hand, in the fuel cell system 11 according to Embodiment 3 heats the hydrogen gas, which has undergone adiabatic expansion and which is to be supplied from the high-pressure hydrogen tank 2. Upon supply of the hydrogen gas inside the high-pressure hydrogen tank 2 to the outside thereof, the hydrogen gas to be supplied may undergo adiabatic expansion due to pressure drop, and the temperature thereof may be reduced. Further, in a below-freezing environment, the temperature of the hydrogen gas is reduced. Upon reduction of the temperature of the hydrogen gas, there arises a problem that the odorant to be mixed therewith is liquefied or solidified. The fuel cell system 11 according to Embodiment 3 solves such a problem.

Figure 4:
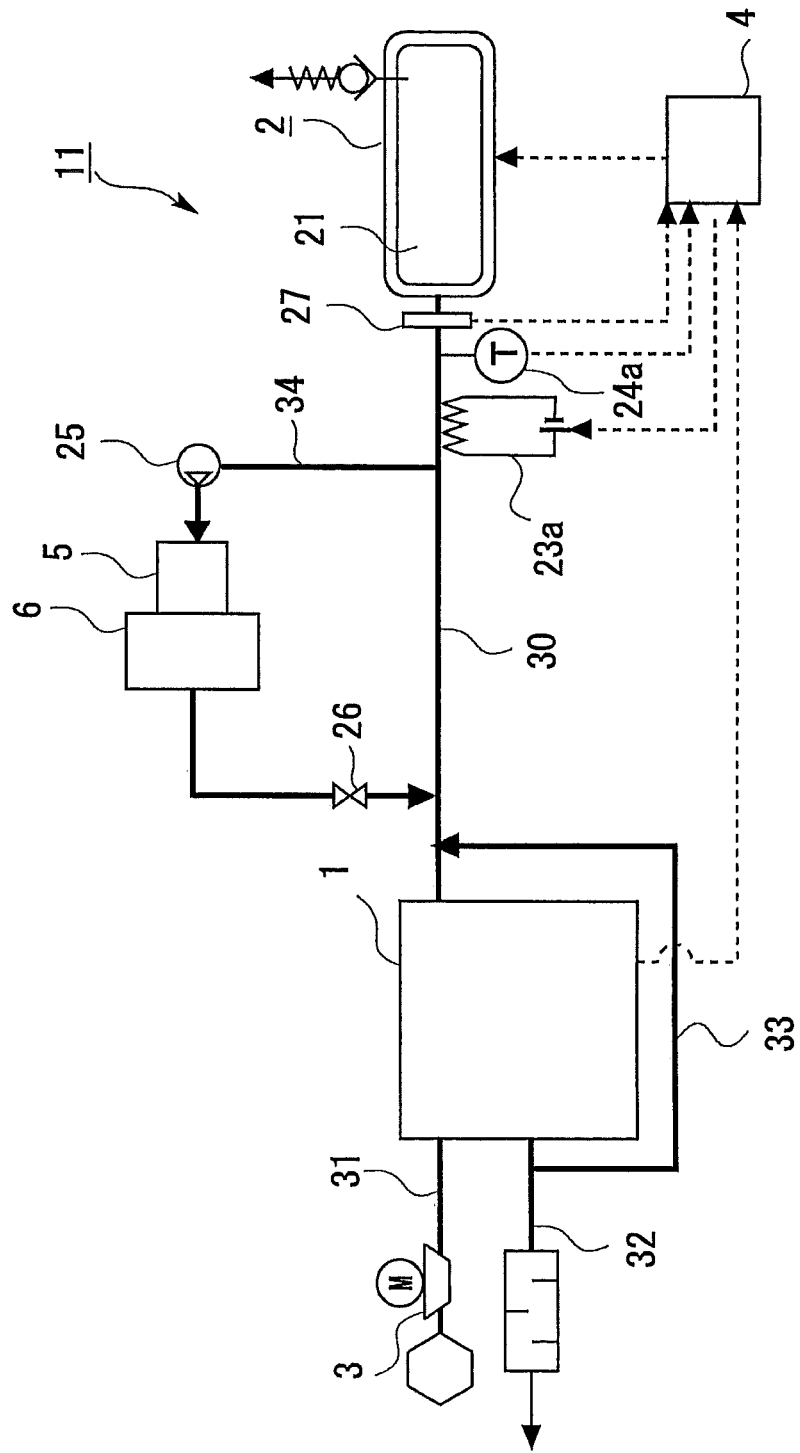
FIG. 4 A block diagram of a water fuel cell system 11 according to Embodiment 3.

FIG. 4 is a system block diagram of the fuel cell system including the hydrogen supply apparatus according to Embodiment 3. The fuel cell system 11 includes: the fuel cell 1; the high-pressure hydrogen tank 2; the air supply apparatus 3; the ECU 4; an odorant tank 5; a buffer tank 6; a heater 23a; a thermometer 24a; a hydrogen gas supply passage 30; an air supply passage 31; an anode off-gas passage 32; a circulating gas passage 33; and a hydrogen gas supply branch passage 34. It should be noted that the components already described above are identified by the same reference numerals, and thus the detailed description thereof will be omitted.

The hydrogen gas supply passage 30 is connected, at its one end, to the high-pressure hydrogen tank 2, and is connected, at its other end, to the anode side of the fuel cell 1 to guide the hydrogen gas to the fuel cell 1. The hydrogen gas supply passage 30 is provided with a hydrogen flowmeter 27, the thermometer 24a, and the heater 23a in this order from the upstream side of the flow of the hydrogen gas.

The hydrogen flowmeter 27 detects the flow rate of the hydrogen gas supplied from the high-pressure hydrogen tank 2. The hydrogen flowmeter 27 is electrically connected to the ECU 4, and the detected hydrogen flow rate is inputted to the ECU 4. Further, the thermometer 24a detects the temperature of the hydrogen gas supplied from the high-pressure hydrogen tank 2. The thermometer 24a is electrically connected to the ECU 4, and the detected temperature is inputted to the ECU 4.

The heater 23a is provided to the hydrogen supply passage 30, and heats the hydrogen gas, passing through the hydrogen supply passage 30, by the control of the ECU 4. The heater 23a can be placed, for example, at a lower part of the hydrogen supply passage 30, but is preferably placed so as to cover the hydrogen gas supply passage 30. This is because the hydrogen gas passing through the hydrogen gas supply passage 30 can be heated efficiently in such a configuration.

The hydrogen gas supply branch passage 34 branches off from the hydrogen gas supply passage 30 at the downstream side of the heater 23a, and merges with the hydrogen gas supply passage 30 again. Further, the hydrogen gas supply branch passage 34 is provided with a pump 25, the odorant tank 5, the buffer tank 6, and an injector 26 in this order from the upstream side of the flow of the hydrogen gas.

The pump 25 adjusts the flow rate of the hydrogen gas to which the odorant is to be added. The odorant tank 5 stores the odorant to be added to the hydrogen gas supplied from the high-pressure hydrogen tank 2. The buffer tank 6 temporarily retains the hydrogen gas supplied from the high-pressure hydrogen tank 2, adds the odorant, stored in the odorant tank 5, to the hydrogen gas, and carries out agitation. Further, the injector 26 is supplied with the hydrogen gas, to which the odorant is added, from the high-pressure hydrogen tank 2, and mixes this hydrogen gas with the hydrogen gas guided through the hydrogen gas supply passage 30 functioning as a main passage.

The air supply passage 31 is connected, at its one end, to the air supply apparatus 3, and is connected, at its other end, to the cathode side of the fuel cell 1 to guide air to the fuel cell 1. The anode off-gas passage 32 guides an anode off-gas, discharged from the anode side of the fuel cell 1, to the outside of the fuel cell system 11. The circulating gas passage 33 branches off from the anode off-gas passage, and merges with the hydrogen gas supply passage to guide the hydrogen gas, contained in the anode off-gas, to the fuel cell 1 again.

Hereinafter, the temperature control of the hydrogen gas in the fuel cell system 11 configured as described above will be described in detail. Each of the various controls described below is executed by the above-mentioned ECU 4, and is a routine repeated at regular intervals.

Figure 5:
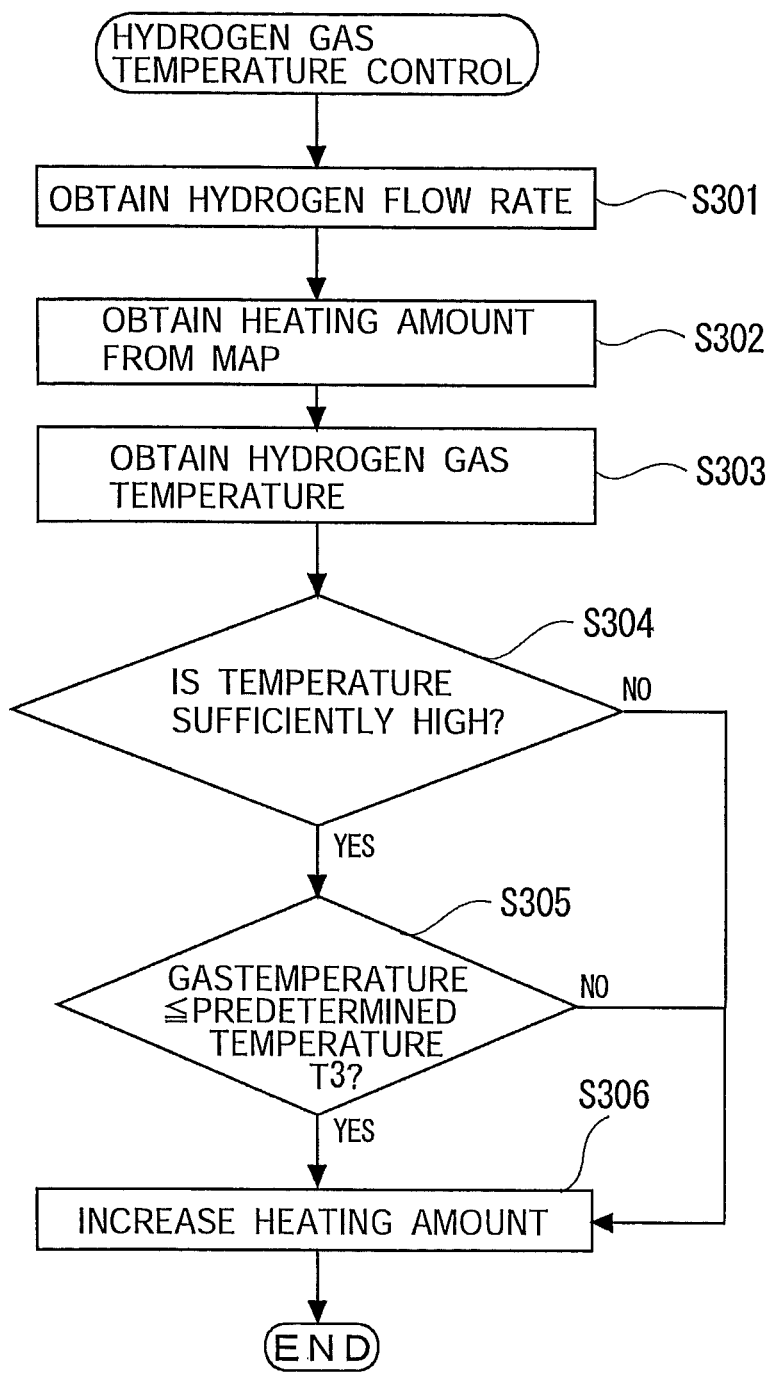
FIG. 5 A flow chart illustrating the temperature control of a hydrogen gas according to Embodiment 3.

FIG. 5 is a flow chart illustrating the temperature control of the hydrogen gas according to Embodiment 3. First, the ECU 4 obtains the flow rate of the hydrogen gas supplied from the high-pressure hydrogen tank 2 to the fuel cell 1 (Step 301). The flow rate of the hydrogen gas can be obtained by the hydrogen flowmeter 27.

Figure 6:
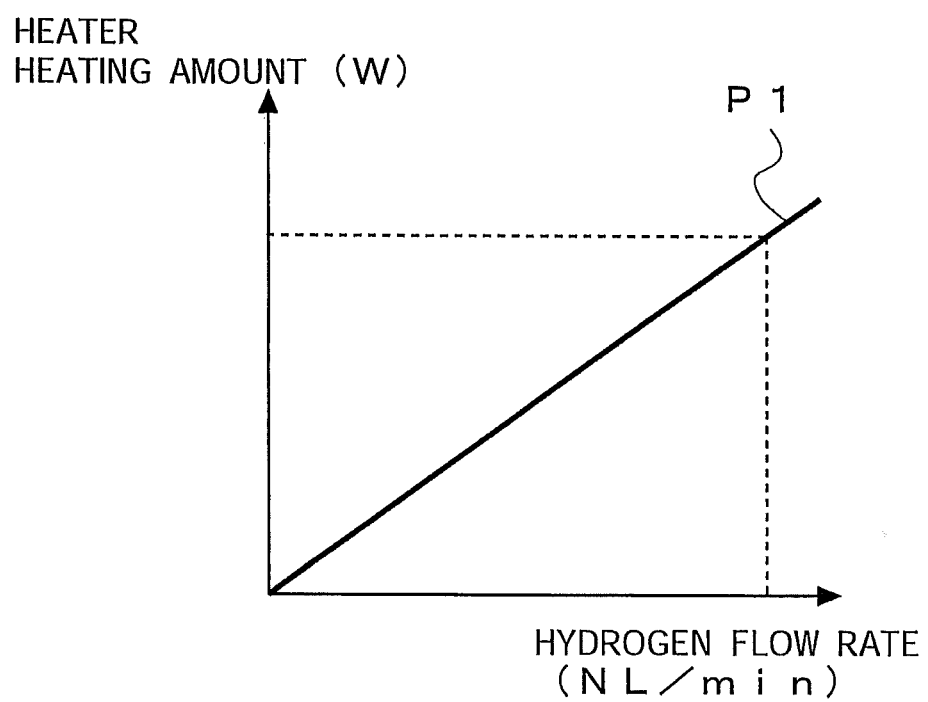
FIG. 6 A map of a necessary heating amount.

Next, the ECU 4 determines, from a map, a heater heating amount associated with the obtained hydrogen flow rate (Step 302). In this regard, a map of a necessary heating amount is shown in FIG. 6. As shown in FIG. 6, the horizontal axis represents the hydrogen flow rate (NL/min), the vertical axis represents the heater heating amount (W), and the straight line P1 represents a variation in the heater heating amount. Such a map of the necessary heating amount may be stored in advance in a memory or the like of the ECU 4, for example.

Then, the ECU 4 obtains the temperature of the hydrogen gas supplied from the high-pressure hydrogen tank 2 (Step 303). The temperature of the hydrogen gas can be obtained by the thermometer 24a. Subsequently, the ECU 4 determines whether the temperature of the hydrogen gas obtained is sufficiently high (Step 304). It should be noted that the sufficiently high temperature of the hydrogen gas portion a temperature at which the odorant to be added does not liquefy or solidify, and may be appropriately set depending on the odorant to be added. If the temperature of the hydrogen gas obtained is determined to be sufficiently high, the ECU 4 ends the temperature control process for the hydrogen gas according to Embodiment 3.

On the other hand, if the temperature of the hydrogen gas obtained is not determined to be sufficiently high, the ECU 4 determines whether the temperature of the hydrogen gas obtained is equal to or lower than a predetermined temperature T3 (Step 305). If the temperature of the hydrogen gas is determined to be equal to or lower than the predetermined temperature T3, the ECU 4 increases the heating amount (Step 306), and ends the temperature control process for the hydrogen gas according to Embodiment 3. It should be noted that the predetermined temperature T3 may be the melting point or the boiling point of the odorant.

As described above, in the temperature control of the hydrogen gas according to Embodiment 3, the ECU 4 determines the heater heating amount from the map, and corrects the determined heater heating amount by the obtained temperature. Thus, the ECU 4 can obtain a more accurate heater heating amount. As a result, in the case where the temperature of the hydrogen gas to be supplied is reduced due to adiabatic expansion or the like, the odorant can be prevented from being liquefied or solidified.

Embodiment 4

Figure 7:
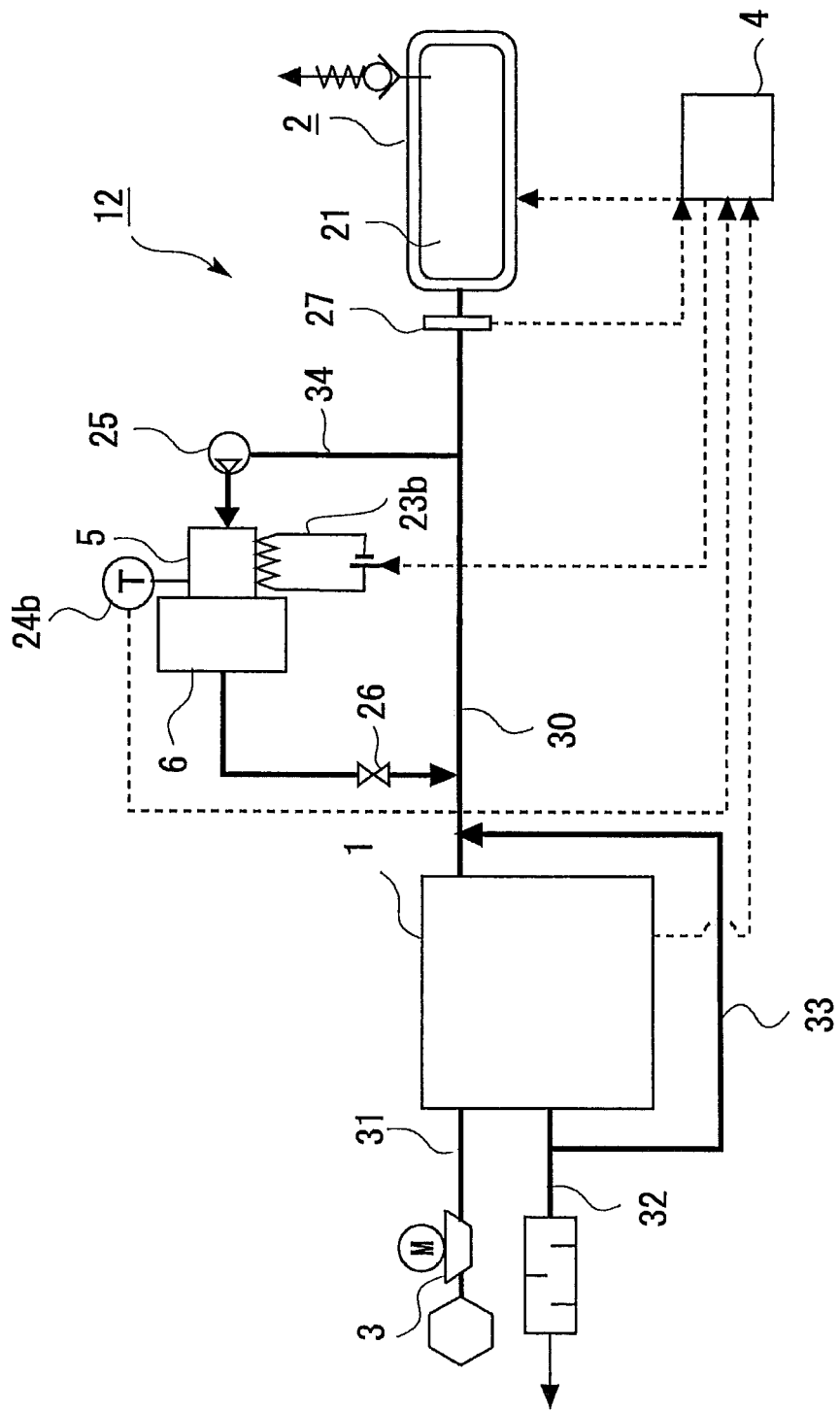
FIG. 7 A block diagram of a fuel cell system 12 according to Embodiment 4.

Next, a fuel cell system 12 including a hydrogen supply apparatus according to Embodiment 4 will be described. FIG. 7 is a system block diagram of the fuel cell system 12 including the hydrogen supply apparatus according to Embodiment 4. The configuration of the fuel cell system 12 according to Embodiment 4 is basically similar to that of the fuel cell system 11 according to Embodiment 3 described above. The fuel cell system 12 according to Embodiment 4 is different from the fuel cell system 11 according to Embodiment 3 in that a heater 23b and a thermometer 24b are provided. It should be noted that the components already described above are identified by the same reference numerals, and thus the detailed description thereof will be omitted.

The thermometer 24b detects the temperature of the odorant stored in the odorant tank 5. The detected temperature is inputted to the ECU 4. The heater 23b is provided at a lower part of the odorant tank 5, and heats the hydrogen gas, stored in the odorant tank 5, by the control of the ECU 4. The position at which the heater 23b is placed may be any position as long as the odorant stored in the odorant tank 5 can be heated, and is not limited to the lower part of the odorant tank 5. However, the odorant in a solid form or in a liquid form is accumulated at the lower part of the odorant tank 5, and therefore, the odorant can be efficiently heated by placing the heater 23b at the lower part of the odorant tank 5.

Figure 8:
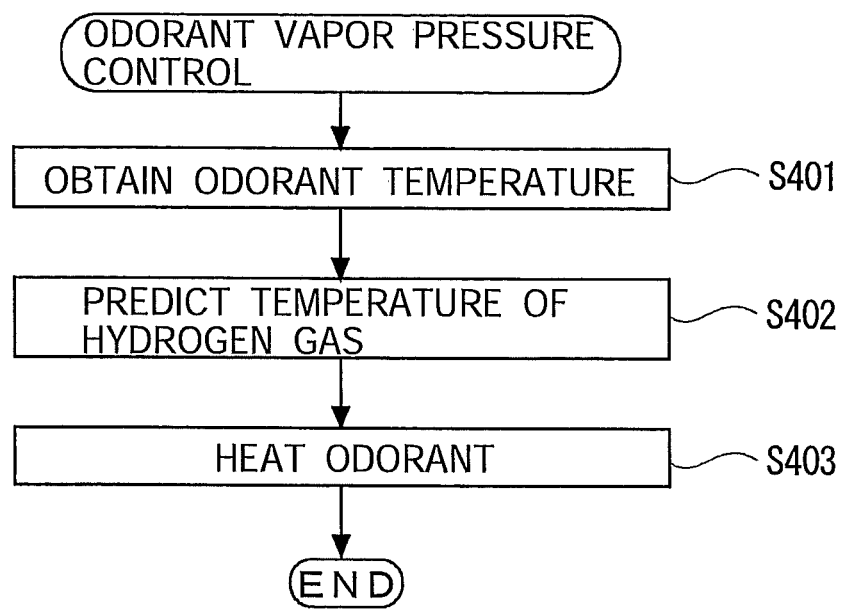
FIG. 8 A flow chart illustrating the vapor pressure control of an odorant according to Embodiment 4.

Next, the vapor pressure control of the odorant according to Embodiment 4 will be described. FIG. 8 is a flow chart illustrating the vapor pressure control of the odorant according to Embodiment 4. First, the ECU 4 obtains the temperature of the odorant, stored in the odorant tank 5, by the thermometer 24b (Step 401).

Then, the ECU 4 predicts how the temperature of the hydrogen gas, supplied from the high-pressure hydrogen tank 2, is reduced due to adiabatic expansion (Step 402). The temperature variation in the hydrogen gas due to adiabatic expansion is obtained as data beforehand, and based on this data, how the temperature of the hydrogen gas is reduced due to adiabatic expansion can be predicted. Further, the temperature of the hydrogen gas supplied from the high-pressure hydrogen tank 2 may be measured for a certain period of time, and based on this measurement, how the temperature is reduced thereafter may be predicted.

Subsequently, the ECU 4 heats the odorant, stored in the odorant tank 5, by the heater 23b so that the odorant reaches a necessary vapor pressure (Step 403). The ECU 4 can determine the heater heating amount based on the temperature of the odorant obtained, the prediction of how the temperature of the hydrogen gas is reduced, and the property of the odorant.

As described above, by carrying out the control so that the heater heating amount is determined based on the temperature of the odorant, the temperature of the hydrogen gas, and the property of the odorant, the temperature of the odorant to be added to the hydrogen gas is raised in advance, and the odorant reaches a necessary vapor pressure, it is possible to prevent the liquefaction or solidification of the odorant, resulting from the cooling thereof by the hydrogen gas whose temperature has been reduced.

Embodiment 5

Figure 9:
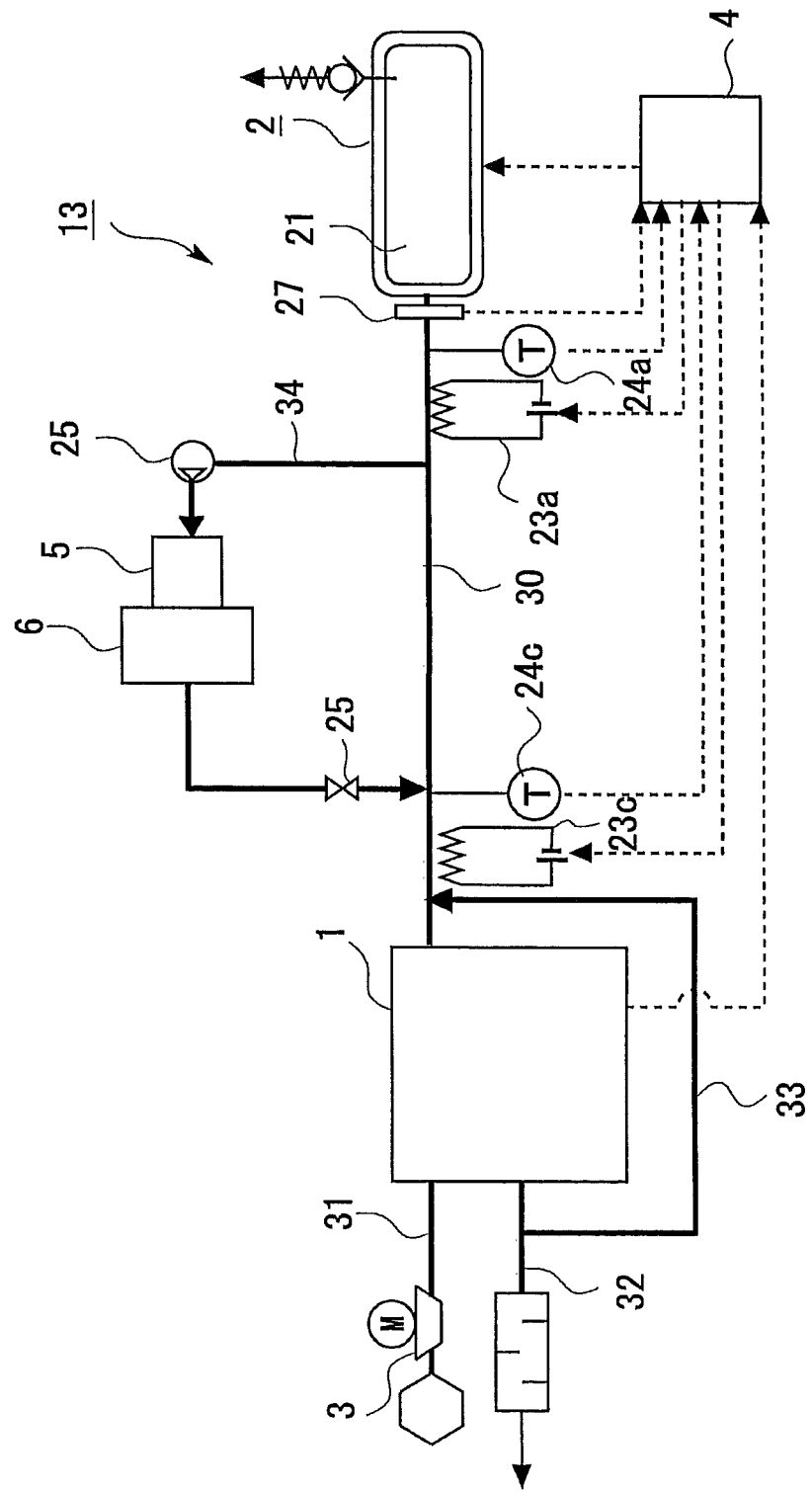
FIG. 9 A block diagram of a fuel cell system 13 according to Embodiment 5.

In addition to the above-described embodiments, for example, the hydrogen gas, to which the odorant has been added, may be heated. FIG. 9 is a schematic block diagram showing a fuel cell system 13 including a hydrogen supply apparatus according to Embodiment 5. The configuration of the fuel cell system 13 according to Embodiment 5 is basically similar to that of the fuel cell system 11 according to Embodiment 3. The fuel cell system 13 according to Embodiment 5 is different in configuration from the fuel cell system 11 according to Embodiment 3 in that a heater 23c and a thermometer 24c are further provided. The fuel cell system 13 according to Embodiment 3 includes the heater 23c, thus making it possible to heat the hydrogen gas, to which the odorant has been added through the buffer tank 6.

It should be noted that the heating of the hydrogen gas, to which the odorant has been added, may be carried out by obtaining the temperature of the hydrogen gas to which the odorant has been added, and by heating the hydrogen gas, to which the odorant has been added, to the extent that the odorant will not be liquefied or solidified, in addition to the execution of the control similar to the temperature control of the hydrogen gas according to Embodiment 3, for example.

Even if the hydrogen gas is heated by the heater 23a, the temperature of the hydrogen gas is gradually reduced thereafter in a below-freezing environment or the like. However, the fuel cell system 13 according to Embodiment 5 can heat the hydrogen gas again after the odorant has been added to the hydrogen gas, and can prevent the liquefaction or solidification of the odorant.

Embodiment 6

Figure 10:
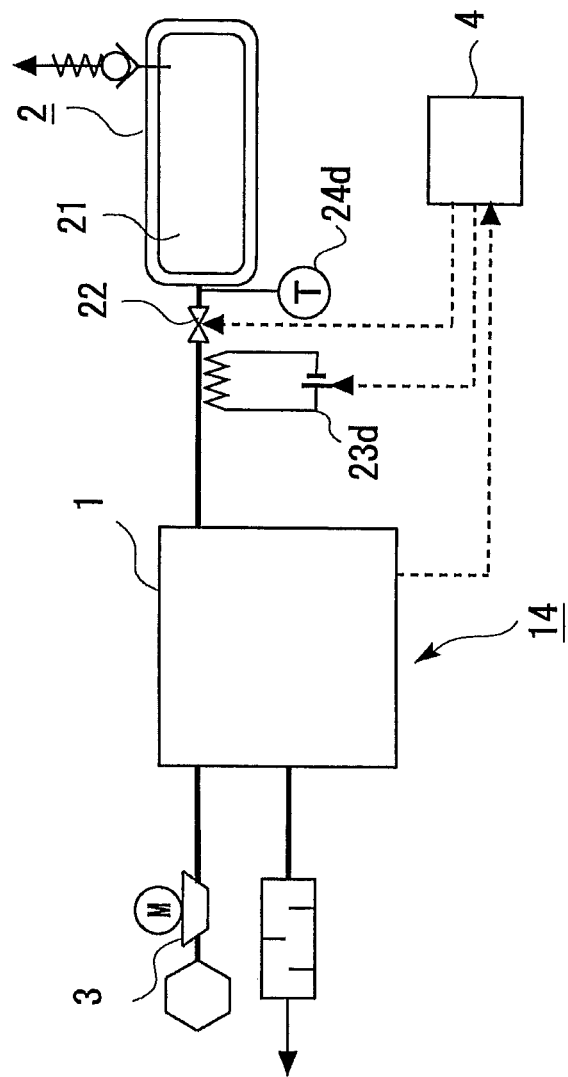
FIG. 10 A block diagram of a fuel cell system 14 according to Embodiment 6.

Further, in the case where the hydrogen gas mixed with the odorant is stored in the high-pressure hydrogen tank 2, the hydrogen gas mixed with the odorant may be heated outside of the high-pressure hydrogen tank. FIG. 10 is a schematic block diagram showing a fuel cell system 14 including a hydrogen supply apparatus according to Embodiment 6. The configuration of the fuel cell system 14 according to Embodiment 6 is basically similar to that of the fuel cell system 10 according to Embodiment 1. The fuel cell system 14 according to Embodiment 6 is different in configuration from the fuel cell system 10 according to Embodiment 1 in that a heater 23d and a thermometer 24d are provided instead of the heater 23 and the thermometer 24 in Embodiment 1, respectively. The fuel cell system 14 according to Embodiment 6 includes the heater 23d and the thermometer 24d, thus making it possible to heat the hydrogen gas mixed with the odorant and supplied from the high-pressure hydrogen tank 2. As a result, the odorant can be prevented from being liquefied or solidified.

Figure 11:
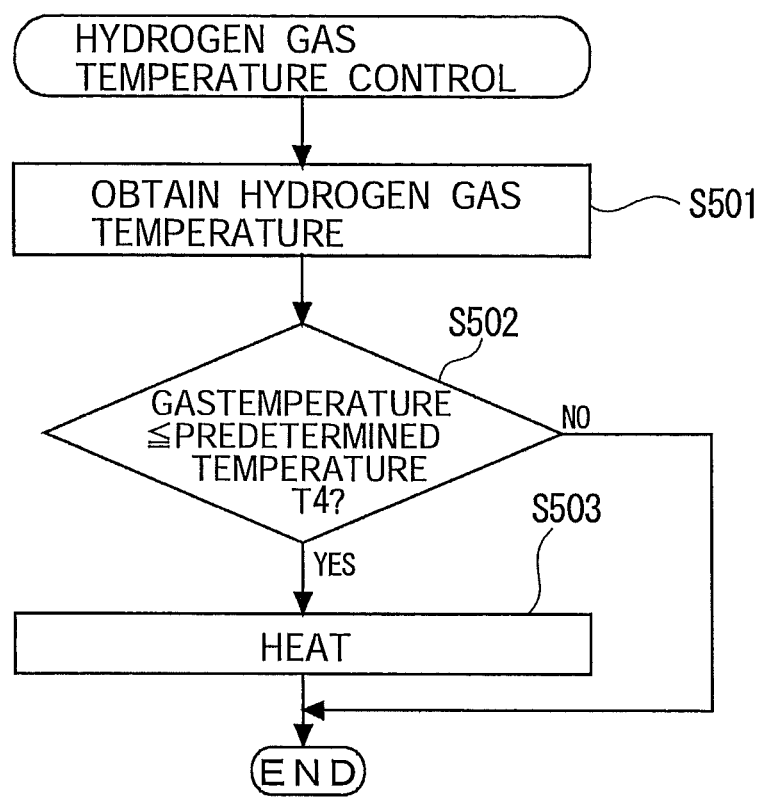
FIG. 11 A flow chart illustrating the temperature control of a hydrogen gas according to Embodiment 6.

It should be noted that the temperature control of the hydrogen gas mixed with the odorant can be carried out by the ECU 4 based on the temperature of the hydrogen gas mixed with the odorant, detected by the thermometer 24d. FIG. 11 is a flow chart illustrating the temperature control of the hydrogen gas according to Embodiment 6. The ECU 4 obtains the temperature of the hydrogen gas, mixed with the odorant, by the thermometer 24d (Step 501), and determines whether the obtained temperature of the hydrogen gas, mixed with the odorant, is equal to or lower than a predetermined temperature T4 (Step 502). Then, if the temperature of the hydrogen gas, mixed with the odorant, is determined to be equal to or lower than the predetermined temperature T4, the ECU 4 heats the hydrogen gas, mixed with the odorant, by the heater 23 (Step 503). On the other hand, if the temperature of the hydrogen gas mixed with the odorant is not determined to be equal to or lower than the predetermined temperature T4, the ECU 4 ends the temperature control of the hydrogen gas mixed with the odorant. It should be noted that the predetermined temperature T4 may be the melting point or the boiling point of the odorant.

In this manner, since the hydrogen supply apparatus according to the present invention is satisfactory so long as the temperature of the hydrogen gas to be supplied can be maintained at a temperature at which the hydrogen gas is easily mixed with the odorant, the present invention is not limited to the foregoing embodiments, and further includes a combination thereof as far as possible.

It should be noted that each of the embodiments has been described using an example in which a hydrogen gas is used as a fuel gas. However, the present invention is not limited thereto, but examples of the fuel gas include a natural gas, and an LPG. Therefore, the present invention may be implemented as a fuel gas supply apparatus.

INDUSTRIAL APPLICABILITY

The fuel gas supply apparatus according to the present invention is capable of suppressing a temperature reduction in fuel gas even at a low temperature, and is useful for the detection of the fuel gas leakage when an odorant and a fuel gas are mixed.

(Note1)

A hydrogen supply apparatus characterized by including: a gas storage portion which stores a hydrogen gas mixed with an odorant; a gas supply portion which supplies the hydrogen gas from the gas storage portion; a gas temperature detection portion which detects a temperature of the hydrogen gas stored in the gas storage portion; and a gas temperature reduction suppression portion which suppresses a temperature reduction in hydrogen gas stored in the gas storage portion, when the temperature of the hydrogen gas detected by the gas temperature detection portion is equal to or lower than a predetermined temperature.

(Note2)

A hydrogen supply apparatus according to Note 1, characterized in that the predetermined temperature is equal to or higher than a melting point of the odorant.

(Note3)

A hydrogen supply apparatus according to Note 1, characterized in that the predetermined temperature is (Note4)

The hydrogen supply apparatus according to any one of Note 1 to Note 3, characterized by further including a heating portion which increases the temperature of the hydrogen gas, in which the gas temperature reduction suppression portion suppresses a temperature reduction in hydrogen gas by the heating portion.

(Note5)

The hydrogen supply apparatus according to any one of Note 1 to Note 3, characterized in that the gas temperature reduction suppression portion decreases an amount of the hydrogen gas supplied by the gas supply portion, to thereby suppress a temperature reduction in hydrogen gas.

The invention claimed is:

1. A hydrogen supply apparatus, comprising:
a high-pressure hydrogen gas tank that stores a hydrogen gas;
an odorant addition portion which adds an odorant to the hydrogen gas;
a temperature adjustment portion that adjusts a temperature of the odorant so as to suppress the odorant mixed with the hydrogen gas from being solidified or liquefied;
an odorant temperature detection portion that detects the temperature of the odorant to be added by the odorant addition portion; and
an odorant vapor pressure control that controls the vapor pressure of the odorant,
wherein the temperature adjustment portion has a heating portion that increases the temperature of the odorant to be added by the odorant addition portion, when the temperature of the odorant detected by the odorant temperature detection portion is equal to or lower than a predetermined temperature, and
wherein the odorant vapor pressure control comprises:
a hydrogen gas prediction portion that obtains a temperature variation in the hydrogen gas due to adiabatic expansion as data beforehand, and for predicting, based on this data, how the temperature of the hydrogen gas is reduced due to adiabatic expansion, and
a heating amount determining portion that determines the heating amount for heating the odorant to be added by the odorant addition portion by the heating portion based on the temperature of the odorant obtained by the odorant temperature detection portion, the prediction of how the temperature of the hydrogen gas is reduced, and a property of the odorant.

2. A hydrogen supply apparatus according to claim 1, wherein the predetermined temperature is equal to or higher than a melting point of the odorant.

3. A hydrogen supply apparatus according to claim 1, wherein the predetermined temperature is equal to or higher than a boiling point of the odorant.

* * * * *

UNITED STATES PATENT AND TRADEMARK OFFICE
CERTIFICATE OF CORRECTION

| | | |
|---|---|---|
| PATENT NO. | : 8,746,274 B2 | Page 1 of 1 |
| APPLICATION NO. | : 13/790457 | |
| DATED | : June 10, 2014 | |
| INVENTOR(S) | : Takahide Izutani et al. | |

It is certified that error appears in the above-identified patent and that said Letters Patent is hereby corrected as shown below:

In the Specification

Column 12, line 1-2: "the fuel cell system" should read --the fuel cell system 11--;

Column 16, line 22: "temperature is" should read --temperature is equal to or higher than a melting point of the odorant.--.

Signed and Sealed this
Thirty-first Day of March, 2015

Michelle K. Lee
*Director of the United States Patent and Trademark Office*